United States Patent Office 2,828,338
Patented Mar. 25, 1958

2,828,338

PRODUCTION OF ORGANIC ACIDS

Joe B. Lavigne, Berkeley, Calif., assignor to California Research Corporation, San Francisco, Calif., a corporation of Delaware No Drawing. Application August 1, 1955
Serial No. 525,798

3 Claims. (Cl. 260—535)

The present invention relates to a process for producing ω-substituted aliphatic carboxylic acids. In particular, this invention relates to an improved method for the preparation of ω-hydroxy-aliphatic carboxylic acids.

U. S. Patent No. 2,601,223, to Roedel, describes a process for producing dibasic carboxylic acids by treating a peroxide of a compound having a cyclic structure consisting of from 4 to 10 carbon atoms in the primary ring, the peroxide being obtainable, for example, by reacting together hydrogen peroxide and a cyclic ketone of the formula:

where R is a divalent radical containing from 3 to 9 carbon atoms in the unsubstituted portion of the radical, with a redox reducing agent. As pointed out by Roedel, the cyclic ketone used may be, for example, one of the following:

Cyclobutanone, where $R=(CH_2)_3$
Cyclopentanone, where $R=(CH_2)_4$
Cyclohexanone, where $R=(CH_2)_5$
Cycloheptanone, where $R=(CH_2)_6$
Cyclooctanone, where $R=(CH_2)_7$
Cyclononanone, where $R=(CH_2)_8$
Cyclodecanone, where $R=(CH_2)_9$ Alternatively, R may contain various substituents, or may contain one or more non-aromatic double bonds. The patent describes a number of cyclic ketones which may be reacted with hydrogen peroxide to form peroxides which yield dibasic carboxylic acids when treated with redox reducing agents. A number of redox reducing agents suitable for use in the reaction are described, and the nature of the reaction system is illustrated by a number of examples in which peroxides are reacted with redox reducing agents to produce dibasic carboxylic acids.

It has now been found that if the process described in Patent No. 2,601,223 is carried out in the presence of a substantial quantity of ferric sulfate, then the entire course of the reaction is altered and the primary product is not a dibasic carboxylic acid, but an ω-hydroxy-substituted acyclic aliphatic monocarboxylic acid having the same number of carbon atoms as are contained in the ketone precursor of the peroxide component of the reaction mixture.

An advantageous method of practicing the invention consists of adding 1 molar part of $H_2O_2$ to 1 to 10 molar parts of a cyclic ketone having the structural formula described above. This reaction mixture is then subjected to intimate contact with a redox reducing agent in the presence of 0.5 to 5 molar parts of ferric sulfate per mol of the cyclic peroxide. The requisite contact can be expedited, for example, by adding the redox reducing agent and the ferric sulfate as solutes in a polar solvent such as methanol or water. If different immiscible solvents are employed in the reaction, the use of a dispersing agent may be advantageous in promoting rapid and thorough contact of the reactions. Protracted reaction periods in the presence of an alcohol solvent may result in the production of corresponding alkyl esters of the ω-hydroxy acid, especially where the reaction is carried out at elevated temperatures. The ω-hydroxy-substituted aliphatic carboxylic acid produced is then separated from the reaction mixture by conventional methods such as solvent extraction, distillation, adsorption, and the like. Depending upon the conditions employed for recovery, the ω-hydroxy acid product may include varying amounts of the corresponding lactone and polyester (homopolymer of the ω-hydroxy carboxylic acid).

This method of preparation of the ω-hydroxy carboxylic acids can be carried out either batchwise, or by a continuous flow process. The method is especially advantageous in that the reactants and products are noncorrosive and nonexplosive, and both unreacted and spent reactants may be recovered as desired.

Example 1

Cyclohexanone (196 g., 2.0 mols) is vigorously stirred during the addition of 30% hydrogen peroxide (56.7 g., 0.5 mol). The reaction lasts 11 minutes, the temperature rising from 20° C. to 36° C. Methanol (25 cc.) is added to make the solution homogeneous. The hydroperoxide solution is then added to a solution of ferrous sulfate heptahydrate (13.9 g., 0.05 mol) and ferric sulfate hydrate (250 g.) in water (95 cc.) and methanol (400 cc.). The addition is carried out at −10° to −5° C. over a period of 4 minutes. Sulfuric acid (58.4 cc.) in 1 liter of water is added and the mixture extracted with benzene. The organic extracts are distilled to remove benzene and unreacted ketone (139 g.). A residue of 31.6 g. of ω-hydroxy caproic acid is obtained as a mixture of acid, lactone and polyesters for a total yield of 55 mol percent based upon hydrogen peroxide.

Example 2

A turbomixer is charged with ferric sulfate hydrate (250 g.) and ferrous sulfate (13.9 g., 0.05 mol) in 200 cc. of water. Cyclohexanone hydroperoxide is prepared as in Example 1 from cyclohexanone (250 g., 2.55 mol) and 30% hydrogen peroxide (56.7 g., 0.5 mol). The addition of the hydroperoxide is started at −5° C. Any tendency toward formation of a precipitate may be offset by the addition of methanol. The final reaction temperature is 8° C. Sulfuric acid (50 cc.) in 500 cc. of water is added, followed by a threefold extraction with benzene. The organic extract is distilled to recover cyclohexanone (203 g.). The residue of ω-hydroxycaproic acid-lactone-polyester weighs 35.4 g. for a total yield of 62% of theory based on hydrogen peroxide. The product may be identified by conversion to the hydrazide, melting point 113 to 115° C.

The reactions described above are conveniently run at temperatures from −10° to +10° C., but temperatures in the range of −70° to +70° C. can be used if desired. Pressures which are higher or lower than atmospheric may be employed if desired; i. e., superatmospheric pressures might be advantageous where especially volatile solvents are employed.

While the foregoing description has been limited to the employment of ferric sulfate to produce ω-hyroxy carboxylic acids, the reaction described in Patent No. 2,601,223 can be similarly altered by the use of other compounds containing higher valent states of those metals which exhibit two or more valence levels, such as copper, nickel, cobalt, manganese, iron and chromium. An explanation for this effect may be that the higher-oxidized metal ion interacts with a free radical produced from the cyclic peroxide and thereby prevents formation of the dibasic acid described in Patent No. 2,601,223. It has been found particularly advantageous when the higher-oxidized metal ion used is of the same metal as the redox reducing agent; in this case the reducing agent consumed in reducing the cyclic peroxide is replenished, possibly by reduction of the higher oxidation state during interaction with the free radical from the cyclic peroxide.

Compounds containing anions other than sulfate can also be successfully employed in practicing this invention to produce ω-hydroxyaliphatic carboxylic acids. These include oxygen-containing anions of mineral acids such as nitrates, perchlorates and phosphates. The yield of the ω-hydroxy carboxylic acid varies both with the anion and the concentration thereof. The production of ω-hydroxy carboxylic acid is observed to compete with the production of a carboxylic acid having the particular anion substituted in the ω-position in place of the hydroxy group. In the use of ferric sulfate, for example, the latter reaction occurs to a negligible extent. In the use of ferric chloride or ferric bromide, however, this competing reaction has been observed to provide the primary product to the exclusion of the ω-hydroxy carboxylic acid.

The ω-hydroxy acids produced pursuant to this invention find important uses in the preparation of monomers and polymers for plastics and plasticizers. The acids may also be reduced to α, ω-diols which are likewise useful in the manufacture of polyesters and plasticizers.

While this invention has been directed to the production of ω-hydroxycarboxylic acids from hydroperoxides derived from cyclic ketones of the formula:

a similar treatment of the tertiary-hydroperoxides derived from alkylalicyclic compounds will give ω-hydroxy ketones. Similarly, alkyl ether derivatives of the cyclic peroxides may be used in the invention instead of cyclic peroxides to produce ω-hydroxy acid esters instead of ω-hydroxy acids.

I claim:
1. A process for producing ω-hydroxyaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic ketone of the formula:

where R is a divalent radical containing from 3 to 9 carbon atoms in the unsubstituted portion of the radical, with a redox reducing agent, in the presence of 0.5 to 5 mols of added ferric sulfate per mol of peroxide.

2. The method as defined in claim 1, wherein the redox reducing agent is ferrous sulfate.

3. A process for producing ω-hydroxyaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic ketone of the formula:

where R is a divalent radical containing from 3 to 9 carbon atoms in the unsubstituted portion of the radical, with ferrous ion as a reducing agent for said peroxide compound in the presence of 0.5 to 5 mols of added ferric sulfate per mol of peroxide.

References Cited in the file of this patent
UNITED STATES PATENTS
2,601,223    Roedel _____ June 24, 1952

FOREIGN PATENTS
1,066,259    France _____ Jan. 20, 1954